(12) United States Patent
Hermening et al.

(10) Patent No.: US 7,281,395 B2
(45) Date of Patent: Oct. 16, 2007

(54) GOB DISTRIBUTOR FOR A GLASS FORMING MACHINE

(75) Inventors: Heinz Hermening, Porta Westfalica (DE); Hermann Bögert, Auetal (DE)

(73) Assignee: Heye International GmbH, Obernkirchen (DE)

( * ) Notice: Subject to any disclaimer, the term of this patent is extended or adjusted under 35 U.S.C. 154(b) by 611 days.

(21) Appl. No.: 10/792,353

(22) Filed: Mar. 3, 2004

(65) Prior Publication Data

US 2005/0022559 A1    Feb. 3, 2005

(30) Foreign Application Priority Data

Mar. 4, 2003    (DE) ................. 203 03 444

(51) Int. Cl.
*C03B 7/14* (2006.01)
(52) U.S. Cl. ........................................ 65/304
(58) Field of Classification Search .................. 65/304
See application file for complete search history.

(56) References Cited

U.S. PATENT DOCUMENTS

| | | | | |
|---|---|---|---|---|
| 3,597,187 A | * | 8/1971 | Trudeau ................. | 65/304 |
| 4,529,431 A | | 7/1985 | Mumford ................ | 65/225 |
| 4,756,736 A | * | 7/1988 | Fenton .................. | 65/225 |
| 4,793,847 A | * | 12/1988 | Kawachi et al. .......... | 65/225 |
| 5,824,129 A | * | 10/1998 | Struckmeier et al. ...... | 65/207 |
| 5,832,780 A | * | 11/1998 | Gallienne ............... | 74/425 |
| 6,318,130 B1 | * | 11/2001 | Bennett ................. | 65/303 |
| 7,047,766 B2 | * | 5/2006 | Schneider et al. ........ | 65/236 |

FOREIGN PATENT DOCUMENTS

| | | |
|---|---|---|
| EP | 0 133 775 | 3/1985 |
| EP | 133775 A2 * | 3/1985 |
| EP | 0 202 116 | 11/1986 |
| EP | 0 273 559 | 11/1987 |
| EP | 0 779 248 | 6/1997 |
| JP | 58 26037 A | 2/1983 |
| JP | 04-342426 | 11/1992 |

\* cited by examiner

*Primary Examiner*—Steven P. Griffin
*Assistant Examiner*—Phu H Nguyen
(74) *Attorney, Agent, or Firm*—Synnestvedt & Lechner LLP (57) ABSTRACT

The gob distributor for a glass forming machine has at least one scoop channel which can be pivoted in a reciprocating manner about a vertical axis. A lower end of each scoop channel can be successively orientated, by the pivoting motion, so as to be aligned with a channel system leading to the respective section. An annular pinion is disposed coaxially with an upper end of each scoop channel. A drive has an electric servomotor which is connected to the at least one annular pinion via a gear mechanism. The gear mechanism includes a screw which can be rotationally driven in a reciprocating manner by the electric servomotor, a worm wheel engaged with the screw, and a toothed wheel which is non-rotational and coaxial with respect to the worm wheel. The toothed wheel is in a driving connection with the at least one annular pinion by means of intermediate wheels.

23 Claims, 11 Drawing Sheets

GOB DISTRIBUTOR FOR A GLASS FORMING MACHINE

CROSS REFERENCE TO RELATED APPLICATION

This application claims priority to German Utility Model Application 203 03 444.9 filed 4 Mar. 2003, which is hereby incorporated by reference herein.

FIELD OF THE INVENTION

The invention relates to a gob distributor for distributing gobs of molten glass in a predeterminable sequence onto molds of a plurality of sections of a glass forming machine.

BACKGROUND OF THE INVENTION

In a known gob distributor as disclosed in EP 0 202 116 A1, FIGS. 10, 11a and 11b the electric servomotor, having a horizontal longitudinal axis, rotationally drives a coaxial recirculating ball spindle by means of a coupling. A recirculating ball nut of a sliding unit, said sliding unit being longitudinally displaceable and secured against rotation, is engaged with the recirculating ball spindle. A plate is articulated on the sliding unit and a rack is articulated on the plate. All annular pinions of the scoop channels mesh with the rack. Disadvantages in this case are the high construction cost, the large space requirement and the large amount of power required from the electric servomotor because of the large masses which have to be accelerated.

In the case of a gob distributor which is disclosed in U.S. Pat. No. 4,529,431 A for double-gob operation the gear mechanism (FIGS. 5 and 6) comprises: An angular gear which can be driven in an alternating manner by the electric servomotor, a vertical driven shaft of the angular gear, a radial arm attached to the driven shaft, on the arm two externally-toothed toothed sectors, which are axially aligned with each other, and a pinion meshing with each toothed sector, wherein each of the two pinions is attached to a vertical shaft which supports a scoop channel and which shafts are disposed laterally spaced apart from each other. Between one of these shafts and the associated scoop channel an open frame is disposed, through which the other scoop channel extends. The afore-mentioned disadvantages also apply to this case.

From U.S. Pat. No. 3,597,187 A it is known per se to drive a screw (FIG. 2) in a constant rotational direction by means of a motor (FIG. 1). The screw turns a worm wheel and this worm wheel turns, via a horizontal shaft, a support disc with a cam ring extending radially outwards over the whole periphery. A cam roller lies against each axial surface of the cam ring. Both cam rollers are mounted on a toothed sector which is attached to a vertical shaft. In the same way as in U.S. Pat. No. 4,529,431 A the toothed sector drives, in an alternating manner, two pinions which are disposed laterally spaced apart from each other and at different heights, and the scoop channels associated therewith. The afore-mentioned disadvantages also apply to this case.

From U.S. Pat. No. 4,793,847 A it is known per se to use an electric servomotor with a horizontal longitudinal axis to drive a coaxial cam shaft in a rotating manner. A cylindrical cam with a screw-like cam path is attached to the cam shaft for each scoop channel. In each case two cam rollers engage over this cam path, these cam rollers extending, in a mutually spaced arrangement, radially outwards from a vertical sleeve portion at the upper end of the scoop channel. The sleeve portion is rotatably mounted in a housing of the gob distributor. This construction is complicated and liable to wear in the region of the cam drive.

From EP 0 133 775 A2 it is known per se to use an electric servomotor with a horizontal longitudinal axis, via a coupling, to drive a shaft and an angular gear so as to rotate a pinion. The pinion meshes with internal toothing of a toothed crown which is rotatably mounted in a housing of the gob distributor. Annular pinions of the scoop channels are rotationally driven by the toothed crown either directly (FIGS. 1 and 3) or via a driving toothed wheel and an intermediate toothed wheel (FIG. 7). In accordance with FIG. 2 each annular pinion is attached externally to a rotatable vertical sleeve portion. The upper end of the associated scoop channel is connected to the sleeve portion at the bottom. The whole gob distributor is displaceable horizontally on two mutually parallel guide rods (FIG. 1) by means of an integrated piston-cylinder unit so that, in emergency operation, the gobs no longer fall into the scoop channels but are diverted into the refuse container. This construction type is also sluggish, expensive and cumbersome.

SUMMARY AND OBJECT OF THE INVENTION

It is the object of the invention to make the gob distributor simpler, lighter and more operationally reliable.

This object is achieved by using a screw that can be rotationally driven in a reciprocating manner by an electric servo motor to rotate one or more scoop channels through a gear train including a worm gear, a worm wheel engaged with the worm wheel and a toothed wheel. The toothed wheel is coaxially attached to the worm wheel and drives at least one pinion mounted on the scoop channel. The gob distributor is particularly suitable for use in I.S. (individual section) glass forming machines which are known per se. The new gear mechanism is compact, extremely precise and easy and quick to access. The annular pinions can rotate in a reciprocating manner, for example by ±70° from a central position.

The gear mechanism has an intermediate toothed wheel for the case where only one scoop channel is provided. Such a machine is normally used to produce relatively large and heavy hollow glass objects. Alternatively, if the geometric properties allow it, the intermediate toothed wheel can also be omitted so that the toothed wheel is then directly engaged with the annular pinion.

The gear mechanism has two intermediate toothed wheels disposed laterally displaced apart from each other where more than one scoop channel is provided. All scoop channels are then preferably driven in common.

The gear mechanism configuration is adapted to the respective number of scoop channels. For example, for double-gob operation each intermediate toothed wheel meshes only with one of the annular pinions. For tripe-gob operation, one intermediate toothed wheel meshes with one of the pinions, and the other intermediate toothed wheel meshes with the two remaining annular pinions. In quadruple-gob operation, each intermediate toothed wheel meshes with two pinions.

Each pinion is radially attached as an externally toothed ring to the outside of a sleeve, thereby achieving a compact construction which is very reliable in operation. The toothed ring is preferably formed as one piece with the sleeve.

The scoop channels can be cooled in a simple and operationally reliable manner using a connection sleeve coaxial with the sleeve and connected in a non-rotational manner to the sleeve and to the upper end of the associated scoop channel. The connection sleeve is mounted in a sealed and rotatable manner in an outer sleeve attached to a housing. The connection sleeve has, in the radially outward direction, first and second annular ducts which are sealed with respect to each other and connected to cooling ducts in a wall of the associated scoop channel. The first annular duct is continuously connected to a cooling supply medium line in the outer sleeve and the second annular duct is continuously connected to a cooling medium supply line also in the outer sleeve. Between the connection sleeve and the upper end of the associated scoop channel an intermediate piece can also be mounted if necessary. Cooling water or a cooling gas can be considered as the cooling medium.

When cooling gas is used, a connection sleeve coaxial with the sleeve is connected in a non-rotational manner to the sleeve and to the upper end of the associated scoop channel. The connection sleeve is mounted in a sealed and rotatable manner in an outer sleeve attached to a housing. The connection sleeve has, in the radially outward direction, a first annular duct which is connected to cooling ducts which are open to the atmosphere in a wall of the associated scoop channel. The first annular duct is continuously connected to a cooling gas supply line in the outer sleeve.

By dividing each intermediate toothed wheel into two partial toothed wheels the clearance in the toothing of the gear mechanism can be minimized in a simple manner. The two partial wheels succeed each other in the axial direction. The two partial wheels can be adjusted with respect to each other in the peripheral direction by means of an eccentric bolt. The eccentric bolt is rotatably mounted with a first portion with a circular cross-section surface in a complementary circular, axially parallel bore in one partial toothed wheel. The eccentric bolt is disposed with an eccentric second portion with a non-cross sectional surface in an axially parallel adjusting bore in the other partial toothed wheel. Both partial toothed wheels of each intermediate toothed wheel are engaged with both the toothed wheel and also with at least one pinion. The eccentric bolt can be rotated with a box spanner, for example by means of a square head. The relative adjustment found in each case between the two partial toothed wheels can be fixed, for example, by the fact that the partial toothed wheels are tensioned against each other by axial screws.

Between the electric servo motor and the screw, a clearance-free or low-clearance shaft coupling is disposed, for example, which is available as a conventional machine element.

By mounting the gob distributor on the glass forming machine so as to be able to pivot in a reciprocating manner about a vertical axis it is possible in a simple and extremely operationally reliable manner to allow the gobs to fall past the gob distributor and to convey them into the waste glass bin in emergency operation.

Effecting the pivoting movement by means of a piston-cylinder unit ensures a rapidly reacting pivoting of the gob distributor. A pneumatic piston-cylinder unit is preferably used in this case. The cylinder is articulated in a pivotable manner on the glass forming machine and the piston rod is articulated on a lever of the gob distributor.

By attaching a positioning body to the lever spaced apart from the longitudinal axis the normal position of the gob distributor can be located quickly and reliably. The positioning body cooperates with a positioning stop which is attached to the glass forming machine and positions the gob distributor in the normal position both in the horizontal and vertical directions.

BRIEF DESCRIPTION OF THE DRAWINGS

These and further features and advantages of the invention are explained in more detail hereinunder with the aid of the exemplified embodiments illustrated in the drawings in which.

DETAILED DESCRIPTION OF PREFERRED EMBODIMENTS

Figure 1:
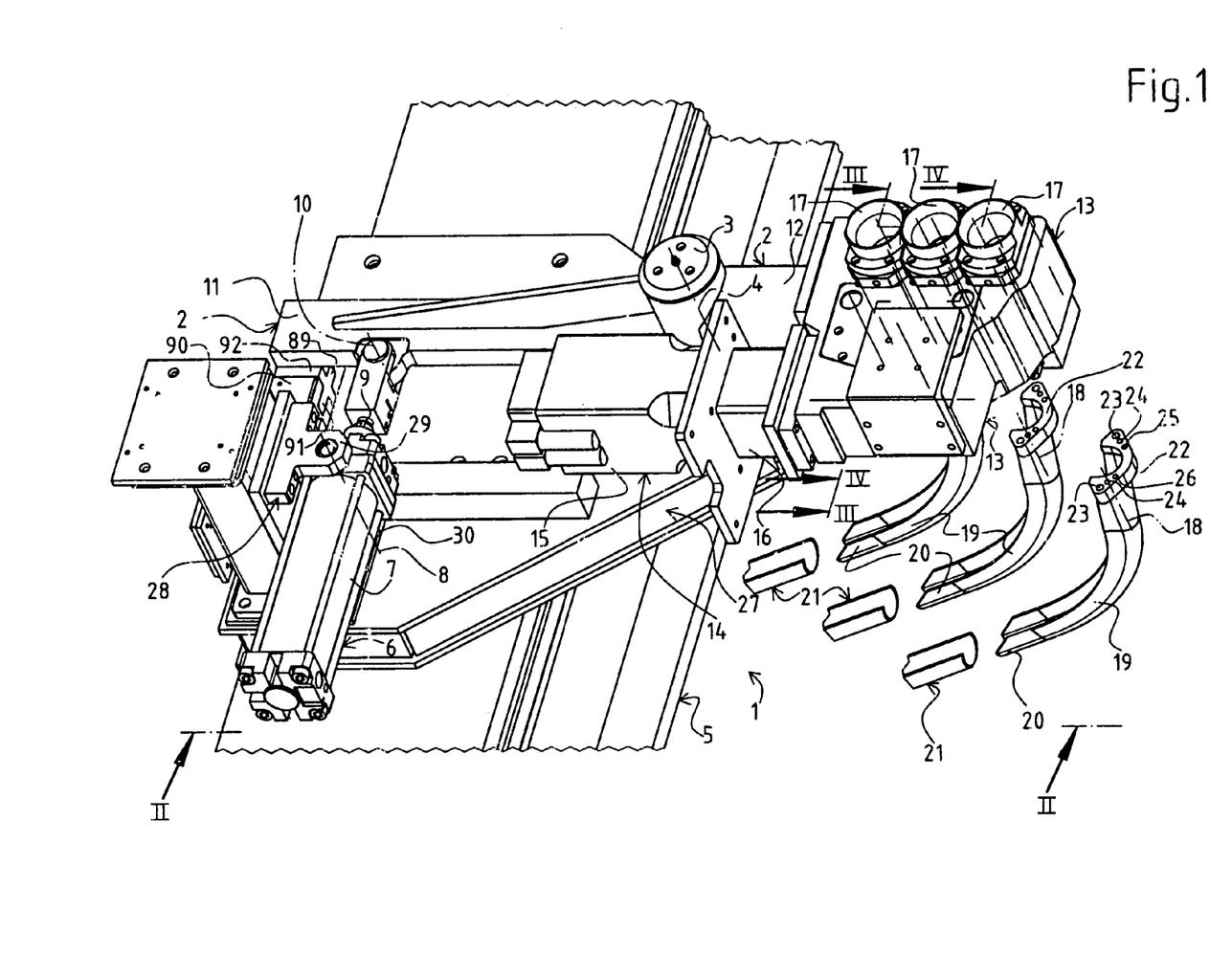
FIG. 1 is a perspective view of a gob distributor arranged for triple-gob operation.

FIG. 1 shows a gob distributor 1 for a glass forming machine, not illustrated further. In a manner which is known per se, gobs of molten glass are periodically supplied, usually in a free-fall manner, to the gob distributor 1. Using shears, these gobs are cut from a glass extrusion, coming from an outlet orifice of a feeder spout. The production of such gobs is known per se and does not need to be illustrated and described in detail herein.

The gob distributor 1 has a frame 2 which is mounted on a base plate 27 of the gob distributor 1 so as to be able to pivot in a reciprocating manner about a vertical axle 3 with a longitudinal axis 4. The pivoting movement is effected by means of a piston-cylinder unit 6, the cylinders 7 of which are mounted on the base plate 27 so as to be able to pivot about a vertical axis 8, and the piston rod 9 of which is articulated along a vertical axis 10 on a lever 11 of the frame 2. A hardened positioning body 89 with a cruciform cross-sectional surface is attached to the end, on the left in FIG. 1, of the lever 11. In the normal—not pivoted out—position of the gob distributor 1 shown in FIG. 1 the positioning body 89 cooperates in such a way with a positioning stop 90, which is also hardened, is attached to the machine and has a U-shaped cross-sectional surface, that the gob distributor 1 is reliably positioned in its normal position both in the horizontal and also in the vertical direction. A horizontal projection 91 on the positioning body 89 thereby engages in a clearance-free manner between the horizontal limbs of the positioning stop 90, while vertical projections 92 above and below the horizontal projection 91 come into position at the free ends of the limbs of the positioning stop 90. The lever is drawn into its normal position by the piston-cylinder unit 6.

A housing 13 is attached to a projection 12 on the frame 2 lying diametrically opposite the lever 11, a drive 14 being flange-mounted on this housing. The drive 14 has an electric servomotor 15 and a clearance-free or low-clearance shaft coupling 16 downstream thereof.

The gobs cut from the glass extrusions, of which there are three mutually parallel ones in this case, by means of the above-mentioned shears, fall into a respective hopper 17 attached to the housing 13 and through the housing 13 in a manner to be described hereinunder. Each drop finally falls into a curved scoop channel 19 which can be pivoted in a reciprocating manner about a vertical axis 18 by means of the drive 14. By pivoting about the vertical axis 18 a lower end 20 of each scoop channel 19 can be successively aligned with a stationary channel system 21 leading to the respective section of an I.S. glass forming machine. Channel systems such as these are known per se and therefore do not need to be explained in more detail herein.

At its upper end each scoop channel 19 supports a flange 22 into the upper surface of which issue bores 23 to receive fastening elements, bores 24 for receiving centering pins and cooling ducts 25 and 26. The cooling ducts 25, 26 pass through the scoop channels 19 in a manner which is known per se and serve to keep the working temperature of the scoop channels 19 at a suitable value.

The axle 3 is attached to the stable base plate 27 which is formed in a substantially L-shaped manner when seen in plan view and also supports a bracket 28 with bearing blocks 29 and 30. The bearing blocks 29, 30 define the vertical axis 8 for the pivoting of the cylinder 7. In accordance with FIG. 2 the base plate 27 is screwed to a scoop beam 5 of the glass forming machine.

Figure 2:
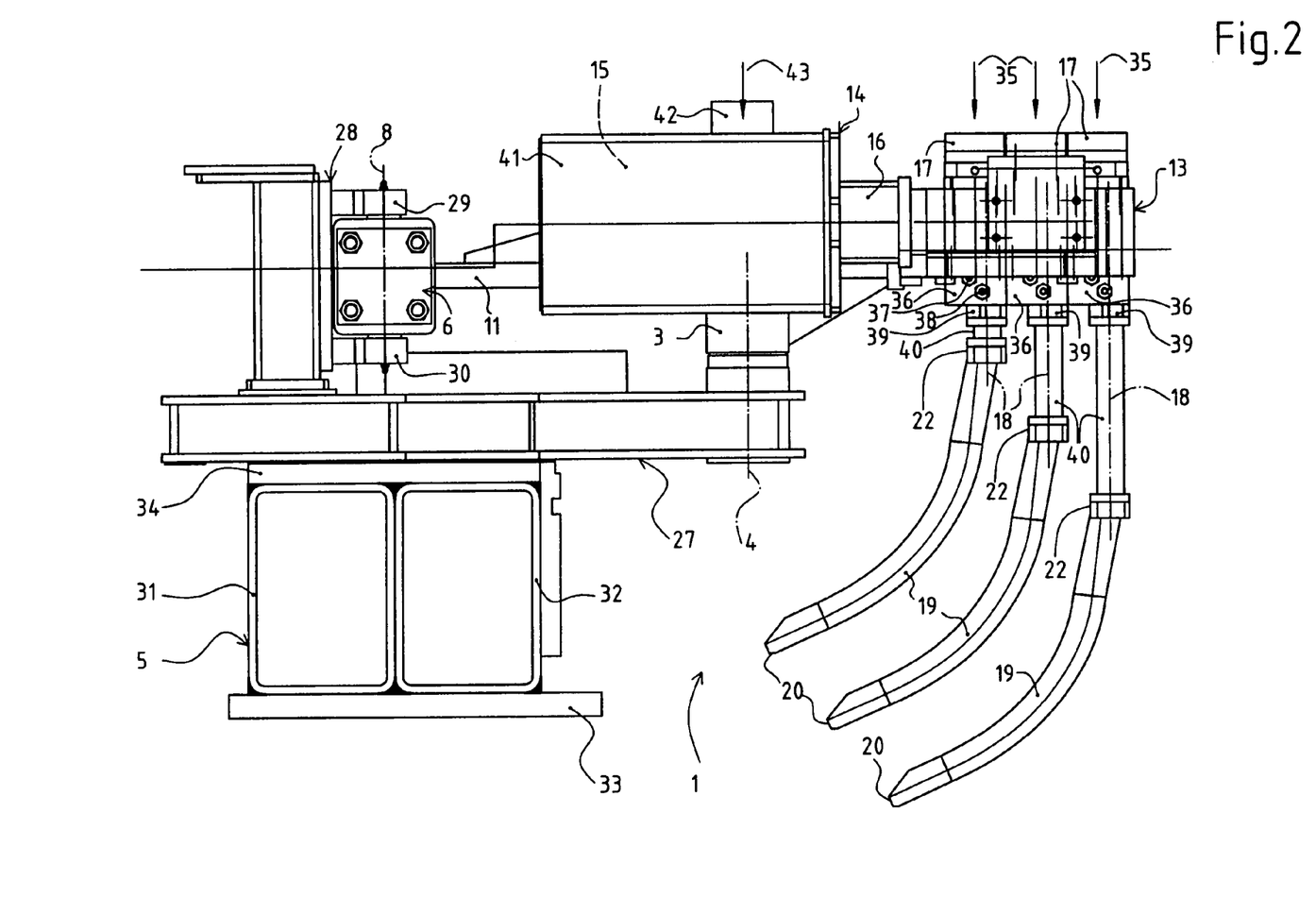
FIG. 2 illustrates a side view at the line II-II of FIG. 1.

FIG. 2 shows that the scoop beam 5 in this exemplified embodiment has two stable pipes 31 and 32 which are welded to each other and which for their part are welded to a lower bearer 33 and an upper bearer 34. The base plate 27 is screwed to the upper bearer 34.

In FIG. 2 the three gobs fall substantially at the same time into the hoppers 17 in the direction of the arrows 35. Outer sleeves 36 are attached to the bottom of the housing 13 and each comprise a connection piece 37 for the supply of cooling medium and a connection piece 38 for the return of used cooling medium. A connection sleeve 39 is mounted in a sealed and rotatable manner in each outer sleeve 36. The connection sleeves 39 protrude downwards out of the associated outer sleeve 36. Tubular intermediate pieces 40 of different lengths, which can be open at the side for space-saving reasons, produce the connection between the connection sleeves 39 and the flanges 22 of the scoop channels 19. Each intermediate piece 40 has cooling ducts, not illustrated, in its wall, which cooling ducts are continuously connected to the cooling ducts 25, 26 of the scoop channels 19. Water is preferably used as the cooling medium.

An increased operating temperature prevails in the region of the gob distributor 1. In order to protect the electric servomotor 15 from the damaging effects of this high operating temperature the electric servomotor 15 is surrounded, in accordance with FIG. 2, by a cooling housing 41 which has been left out of FIG. 1 for the sake of simplicity and clarity. Cooling air is supplied to the cooling housing 41 in the direction of an arrow 43 via a connection piece 42. The used cooling air is discharged from the cooling housing 41 through suitable outlet orifices.

Figure 3:
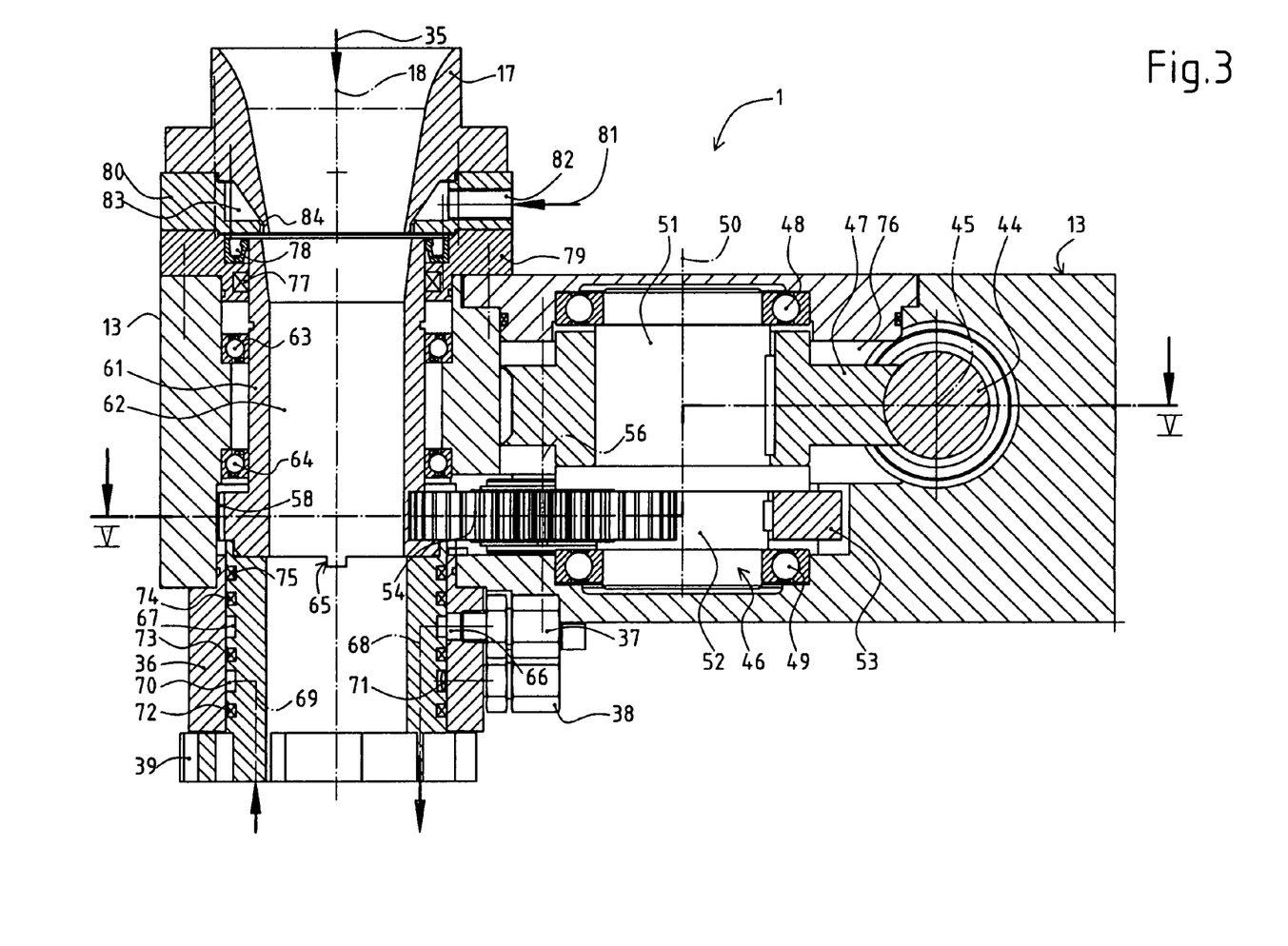
FIG. 3 shows an enlarged cross-sectional view at the line III-III of FIG. 1.
Figure 5:
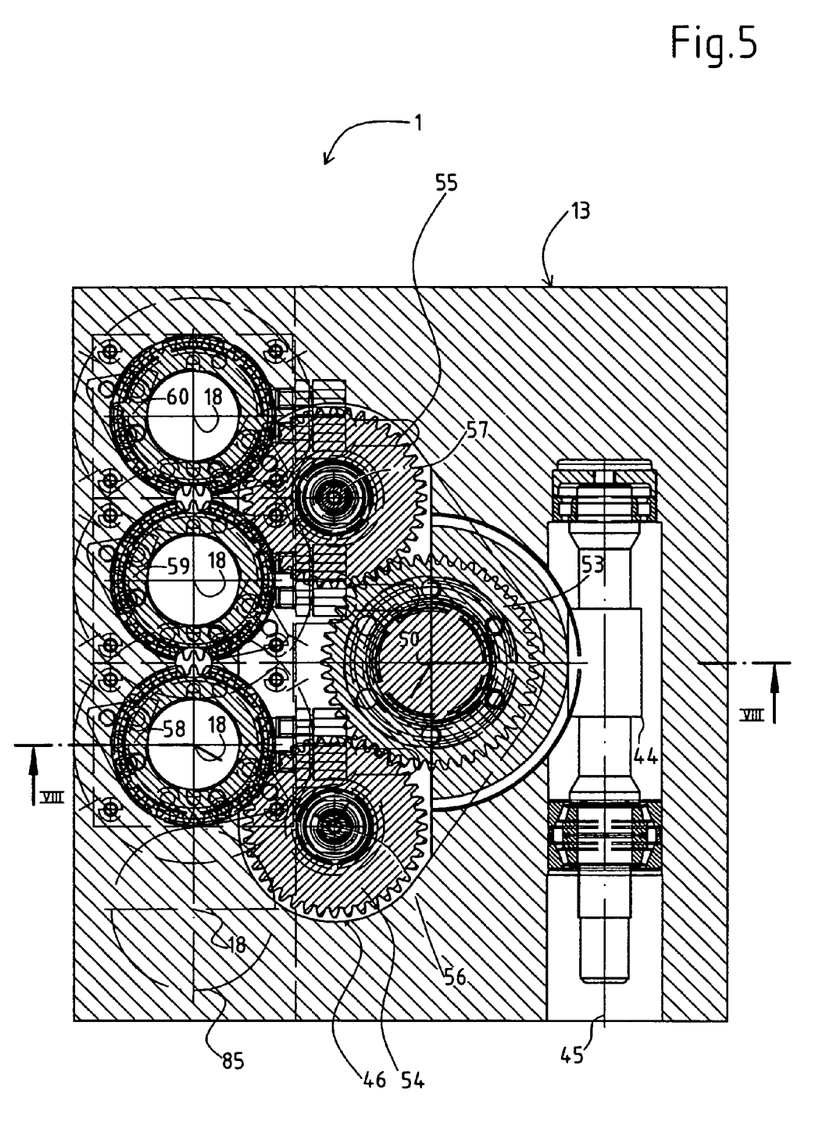
FIG. 5 shows a cross-sectional view at line V-V of FIG. 3.

In accordance with FIG. 3 the drive 14 (FIGS. 1 and 2) drives a coaxial screw 44, which is mounted in the housing 13 and has a horizontal longitudinal axis 45, rotationally in a reciprocating manner. Details of the screw 44 and its mounting are shown in FIG. 5. The screw 44 is a component of a gear mechanism 46 with which the reciprocating rotational movement is transferred from the drive 14 to the connecting sleeves 39 and from there via the intermediate pieces 40 (FIG. 2) to the scoop channels 19. In accordance with FIGS. 3 and 5 the gear mechanism 46 comprises a worm wheel 47 which is in engagement with the screw 44 and is rotatably mounted in the housing 13 with a vertical longitudinal axis 50 with a shaft 51 by means of roller bearings 48 and 49. The shaft 51 has a lower projection 52 with which a toothed wheel 53 is connected in a non-rotational manner. Two intermediate toothed wheels 54 and 55, which are disposed laterally spaced apart from each other, are in engagement with the toothed wheel 53. The intermediate toothed wheels 54, 55 are mounted in a freely rotatable manner in the housing 13 with perpendicular longitudinal axes 56 and 57. The intermediate toothed wheel 54 is in engagement with an annular pinion 58 while the intermediate toothed wheel 55 meshes with annular pinions 59 and 60.

In accordance with FIG. 3 the annular pinion 58 is attached to a sleeve 61 in a radially outward manner as an externally-toothed toothed ring. Annular pinion 58 and sleeve 61 can—as in this case—be formed in one piece or two pieces. The sleeve 61 is disposed coaxially with the upper end (cf. 22) of the associated scoop channel 19 (FIGS. 1 and 2) and allows the gobs to pass through an axial aperture 62. The sleeve 61 is mounted in a rotatable manner in the housing 13 by means of roller bearings 63 and 64, and by means of a claw coupling 65 or axial pins, it is in a form-locking rotational driving connection with the connection sleeve 39. The connection sleeve 39 is screwed to the sleeve 61 by screws, not illustrated. As already mentioned, each connection sleeve 39 is connected to one of the scoop channels 19 in a non-rotational manner by means of the associated intermediate piece 40.

As already mentioned the scoop channels 19 are cooled by a cooling medium. The cooling medium is fed in through the connection piece 37 in accordance with FIG. 3 and, via a tap bore 66 in the wall of the outer sleeve 36, enters a first annular duct 67 externally in the connection sleeve 39. The first annular duct 67 is connected, via a line 68 and a connection line, not illustrated, in the wall of the associated intermediate piece 40, to the cooling duct 25 (FIG. 1) of the associated scoop channel 19. The cooling duct 26 (FIG. 1) is connected, via a connection line in the wall of the associated intermediate piece 40, to a line 69 (FIG. 3) in the wall of the connection sleeve 39. The line 69 issues into a second annular duct 70 externally in the connection sleeve 39. The annular duct 70 is continuously connected, via a tap bore 71 in the wall of the outer sleeve 36, to the connection piece 38. A constant or pulsed circulation of cooling medium through each scoop channel 19 is thereby ensured. Annular seals 72 to 75 seal the outer surface of the connection sleeve 39 with respect to the outer sleeve 36. An inner chamber 76, which receives the gear mechanism 46, of the housing 13 is preferably completely flooded with lubrication oil so that the gear mechanism and all bearings always run in the oil bath.

An upper end of the sleeve 61 is sealed by annular seals 77 and 78 with respect to a head plate 79 screwed to the housing 13. The hopper 17 is screwed to the head plate 79 by means of an intermediate plate 80. The intermediate plate 80 is supplied with compressed air through a bore 82 in the direction of an arrow 81. This compressed air enters an annular chamber 83 and from there enters the aperture 62 via an annular gap 84 between the hopper 17 and the intermediate plate 80. In this way a downwardly directed compressed air ring is produced which enhances the transport of the gobs through the system and also centres the gob in order to prevent impact (contact) of the gob.

Figure 4:
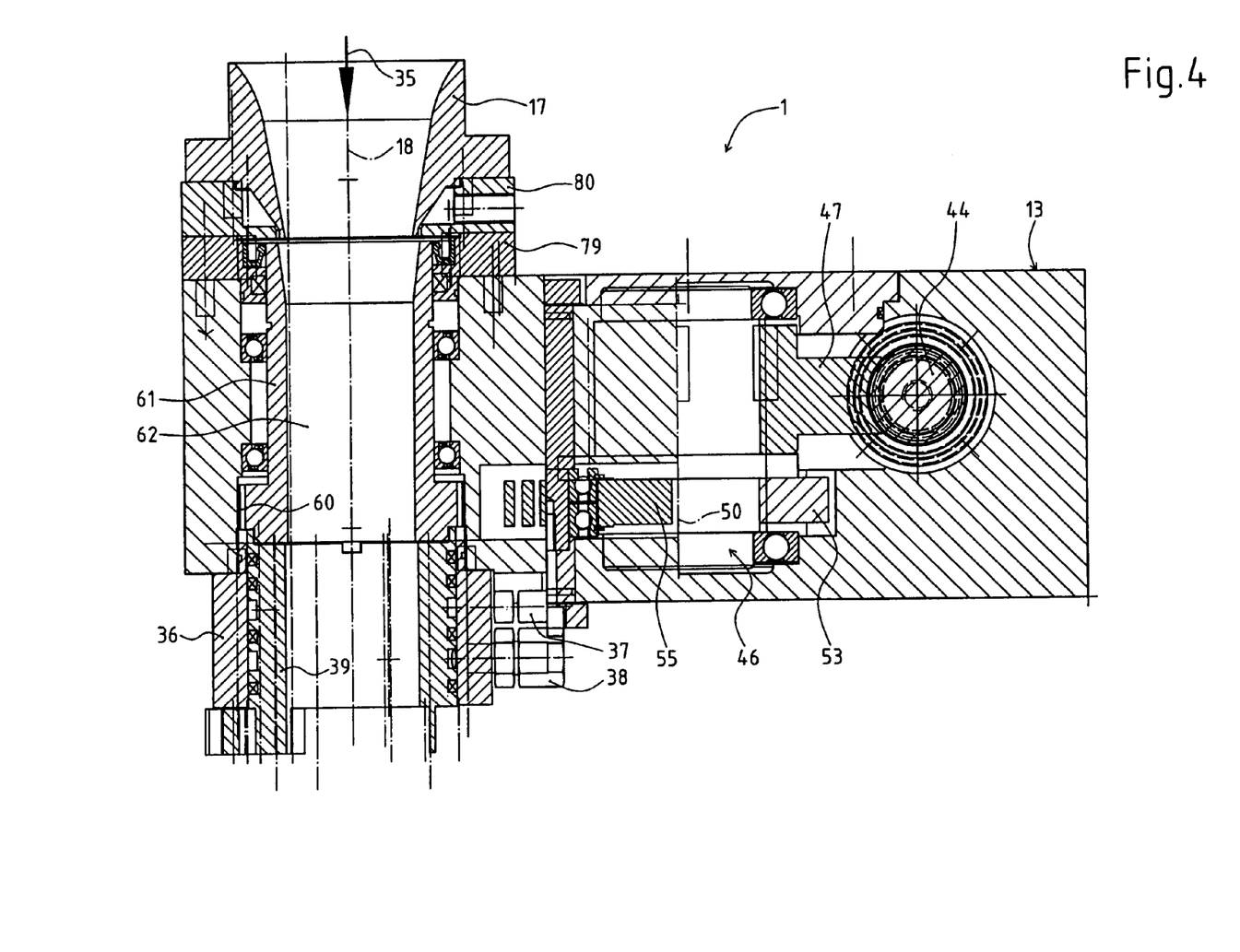
FIG. 4 shows an enlarged cross-sectional view at the line IV-IV of FIG. 1.

When viewed in association with FIG. 5 FIG. 4 shows further details of the gear mechanism 46.

In FIGS. 1 to 5 the gob distributor 1 for triple-gob operation is illustrated with solid lines. In accordance with FIG. 5 the gob distributor 1 can be expanded for a quadruple-gob operation. This takes place, for example, in that a fourth scoop channel is disposed laterally aligned with the three scoop channels 19 already provided. The associated annular pinion 85 thereof is indicated at the bottom left in FIG. 5 in dot-dash lines. The annular pinion 85 would then be engaged with the intermediate toothed wheel 54 in the same way as the annular pinion 58.

In all figures of the drawings like parts are provided with like reference numerals.

Figure 6:
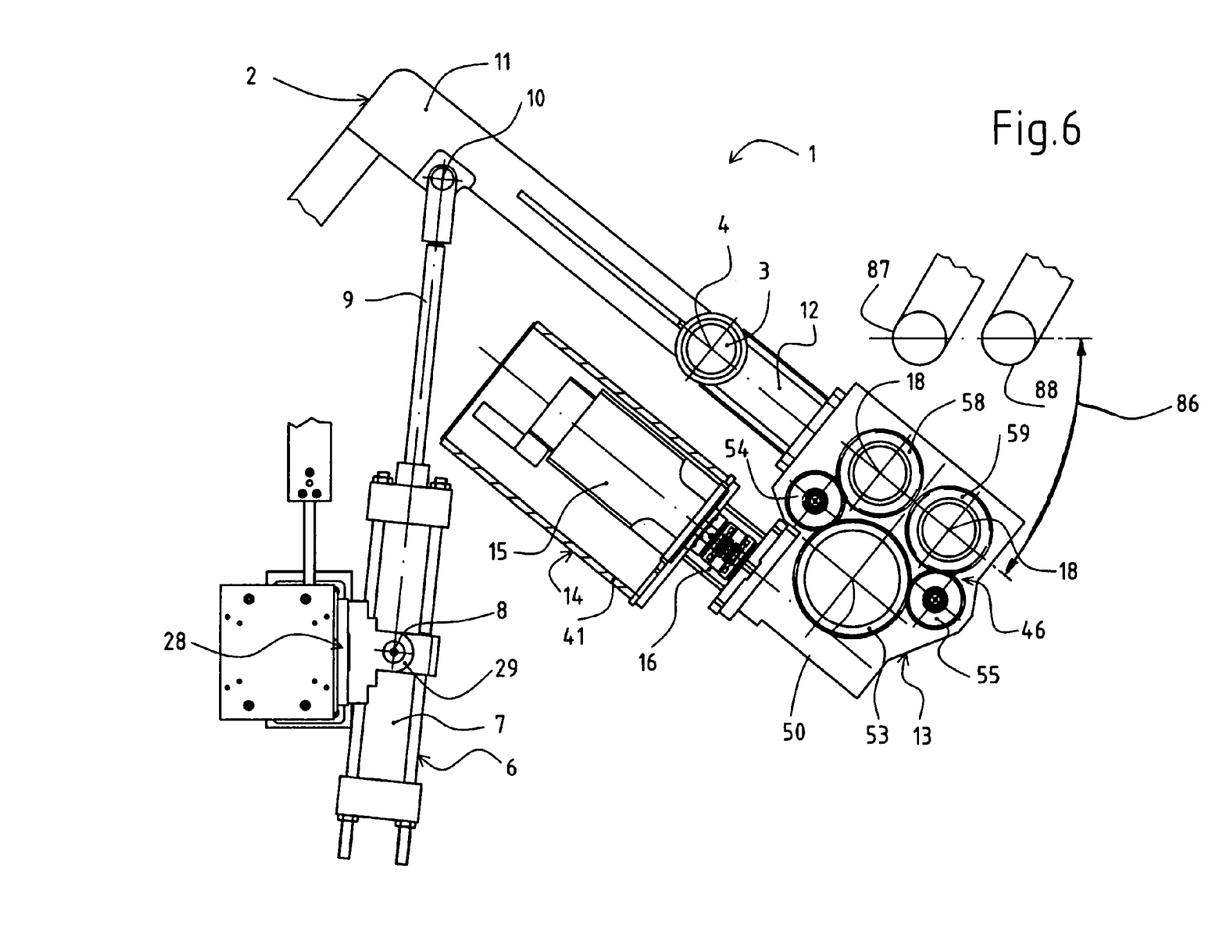
FIG. 6 shows a plan view of another embodiment of the gob distributor with only two scoop channels in the pivoted emergency operation position.

FIG. 6 shows a gob distributor 1 provided for double-gob operation. In the gear mechanism 46 each intermediate toothed wheel 54, 55 is engaged in this case with only one annular pinion 58; 59.

While in FIGS. 1 and 2 the gob distributor 1 is shown in its position corresponding to normal operation, in FIG. 6 the piston-cylinder unit 6 has been actuated for emergency operation and the piston rod 9 has been extended. This has led to the frame 2 being pivoted about the longitudinal axis 4 by an angle 86 of, for example, 39°. The gobs thereafter delivered by the shears now no longer fall into the hoppers 17 appertaining to the annular pinions 58, 59 (cf. FIG. 3) but into the waste channels 87 and 88. When the disruption in the glass forming machine has been overcome the piston rod 9 can be retracted and the gob distributor 1 can be pivoted back into its normal operating position.

Figure 7:
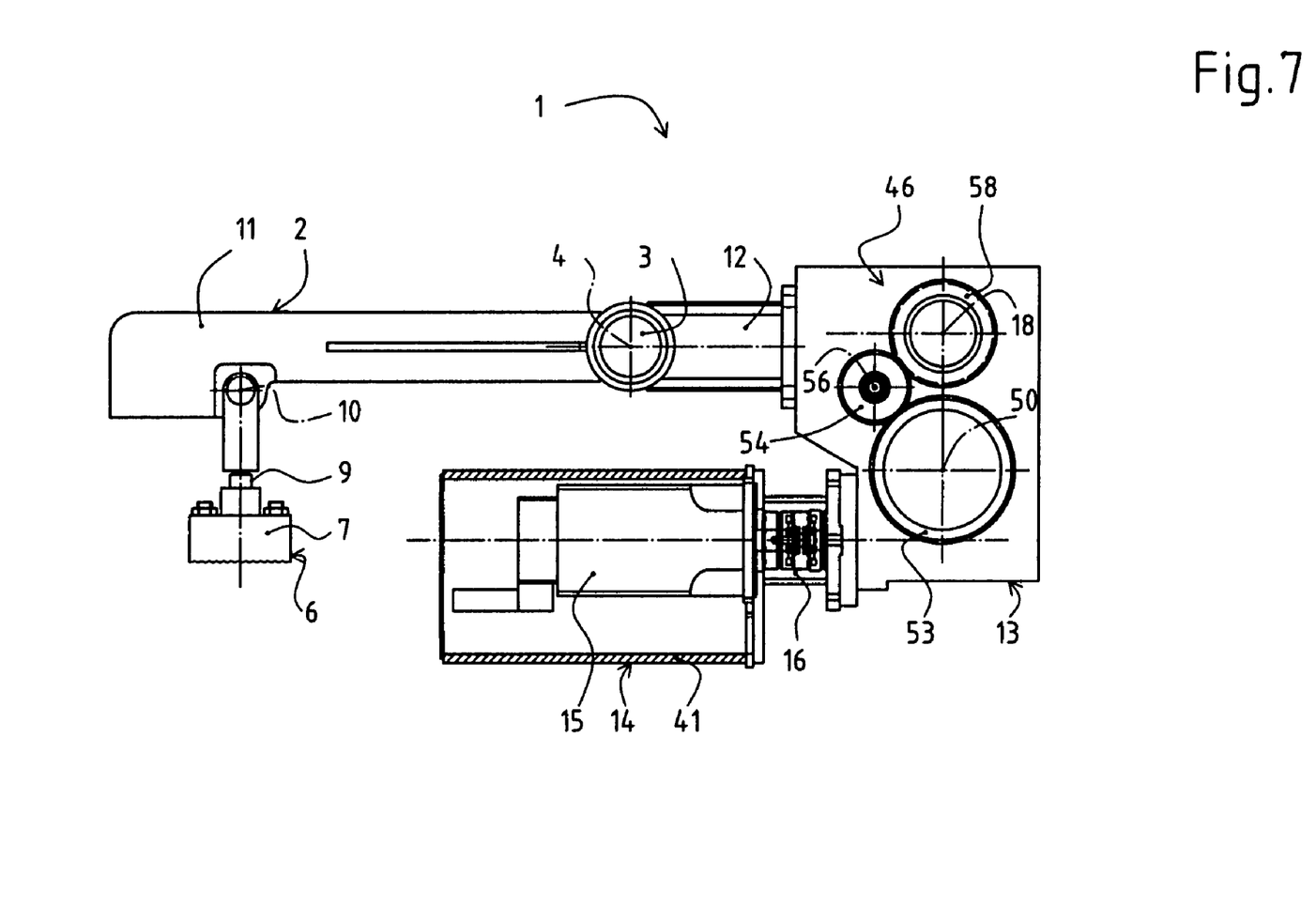
FIG. 7 shows a plan view of still another gob distributor with only one scoop channel.
Figure 8:
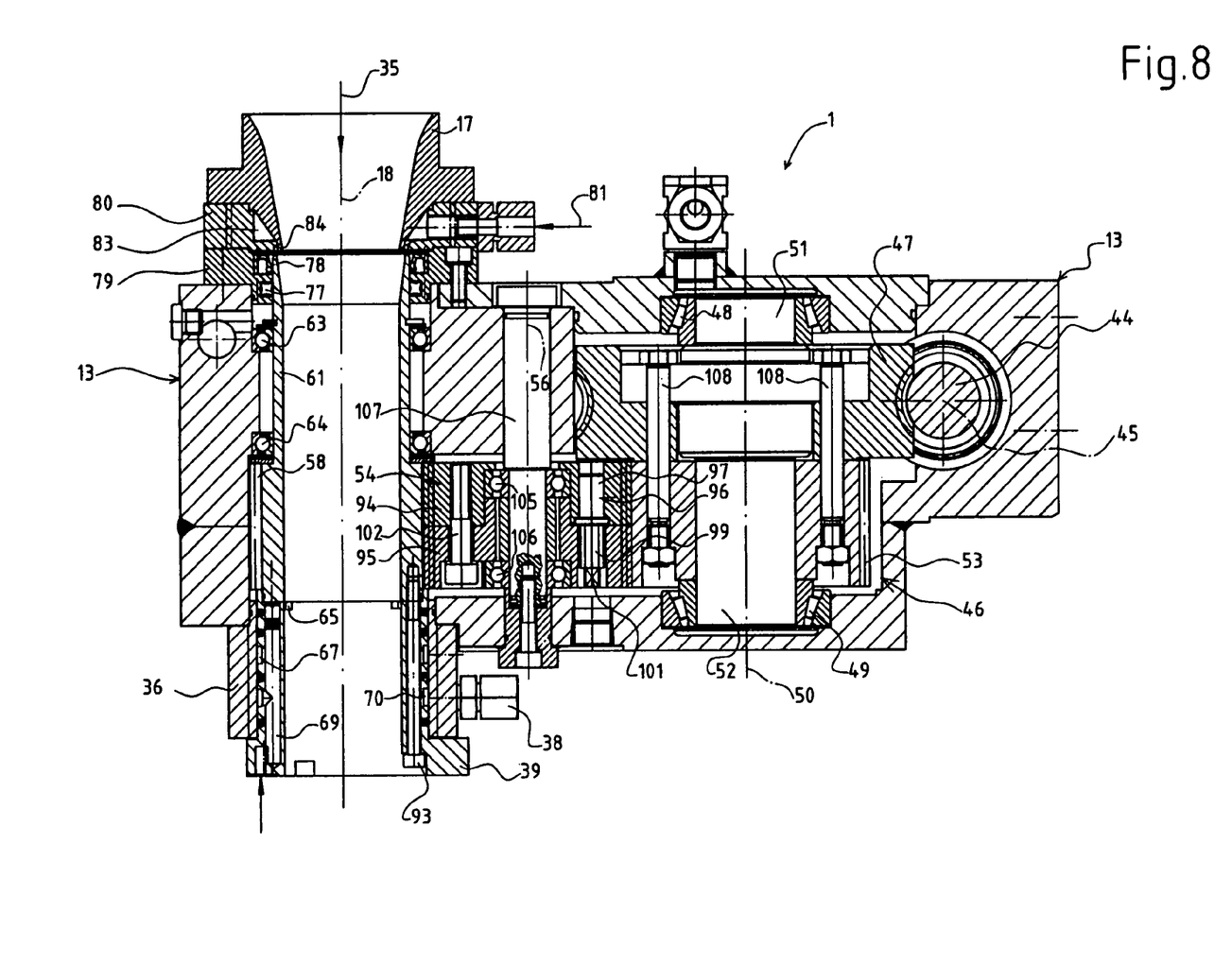
FIG. 8 illustrates a cross-sectional view corresponding to FIGS. 3 and 4 through another embodiment of the gob distributor with an intermediate toothed wheel comprising two partial toothed wheels, this shows in principle the section at line VIII-VIII of FIG. 5.

FIG. 7 shows a gob distributor 1 for single-gob operation with only one scoop channel. Accordingly only the single annular pinion 58 is also provided which is rotationally driven in a reciprocating manner by the toothed wheel 53 via the intermediate toothed wheel 54. FIG. 8 shows that the connection sleeve 39 is attached to the bottom of the sleeve 61 by axially parallel screws 93.

The intermediate toothed wheel 54 is divided into two partial toothed wheels 94 and 95 which succeed each other in the axial direction. The two partial toothed wheels 94, 95 can be adjusted with respect to each other in the peripheral direction in order to minimize the clearance in the toothing of the gear mechanism 46. The desired relative position can be adjusted by an eccentric bolt 96. The eccentric bolt 96 is rotatably mounted with a first potion 97 with a circular cross-sectional surface in a complementarily circular, axially parallel bore 98 (FIG. 9) in the upper partial toothed wheel 94. The eccentric bolt 96 is also disposed with an eccentric second portion 99 with a non-round cross-sectional surface in an axially parallel adjusting bore 100 (FIG. 10) in the other partial toothed wheel 95. In accordance with FIG. 8 the second portion 99 has a square head 101 at the bottom, onto which a corresponding box spanner can be placed. By rotating the box spanner the second portion 99 exerts its cam effect onto the lower partial toothed wheel 95 and turns this wheel relative to the upper partial toothed wheel 94 until the clearance in the toothing of the gear mechanism 46 is minimized in the desired manner. The relative rotational positioning thereby achieved between the partial toothed wheels 94 and 95 is then fixed by tightening four screws 102 distributed around the periphery. Each screw 102 passes through a bore 103 (FIG. 10) in the lower partial toothed wheel 95 and is screwed into a threaded bore 104 in the upper partial toothed wheel 94.

The partial toothed wheels 94, 95 are mounted in a freely rotatable manner on a mounted insert axis 107 by means of roller bearings 105 and 106. Both partial toothed wheels 94, 95 of the intermediate toothed wheel 54 are engaged with both the toothed wheel 53 and also with the annular pinion 58.

FIG. 8 shows how the toothed wheel 53 is attached by axially parallel screws 108 to the lower side of the worm wheel 47.

Figure 9:
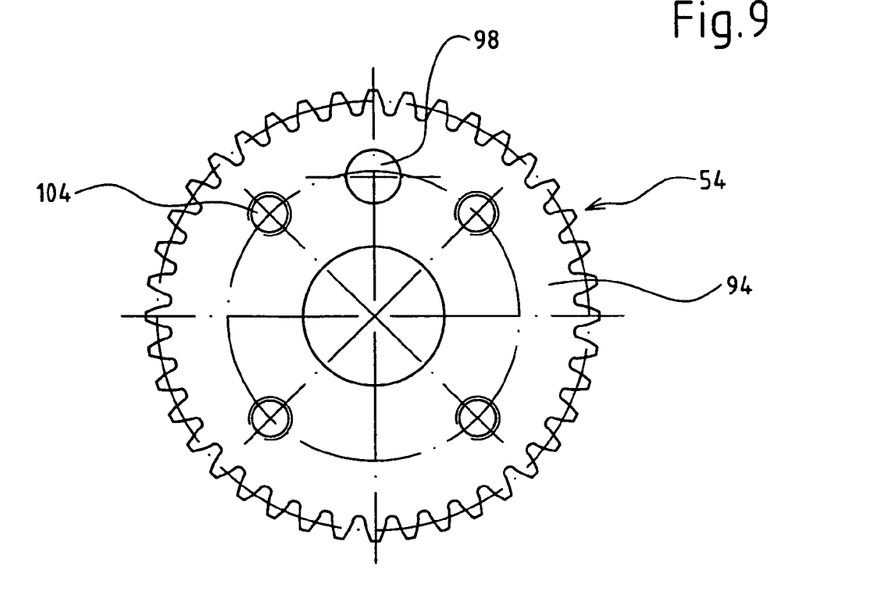
FIG. 9 illustrates an enlarged plan view of the upper partial toothed wheel in accordance with FIG. 8.
Figure 10:
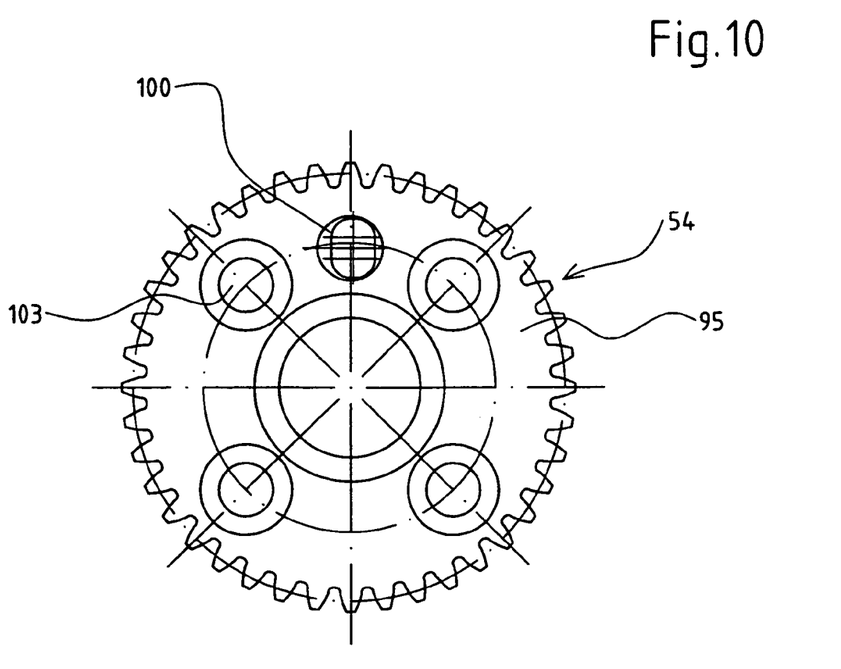
FIG. 10 illustrates an enlarged plan view of the lower partial toothed wheel in accordance with FIG. 8.

FIGS. 9 and 10 show details of the partial toothed wheels 94, 95.

Figure 11:
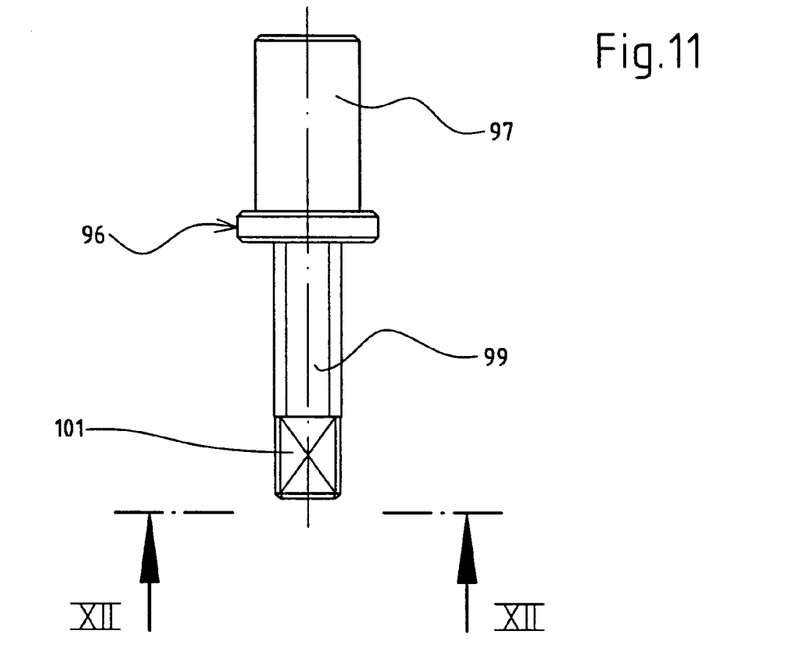
FIG. 11 shows an enlarged side view of the eccentric bolt in accordance with FIG. 8.
Figure 12:
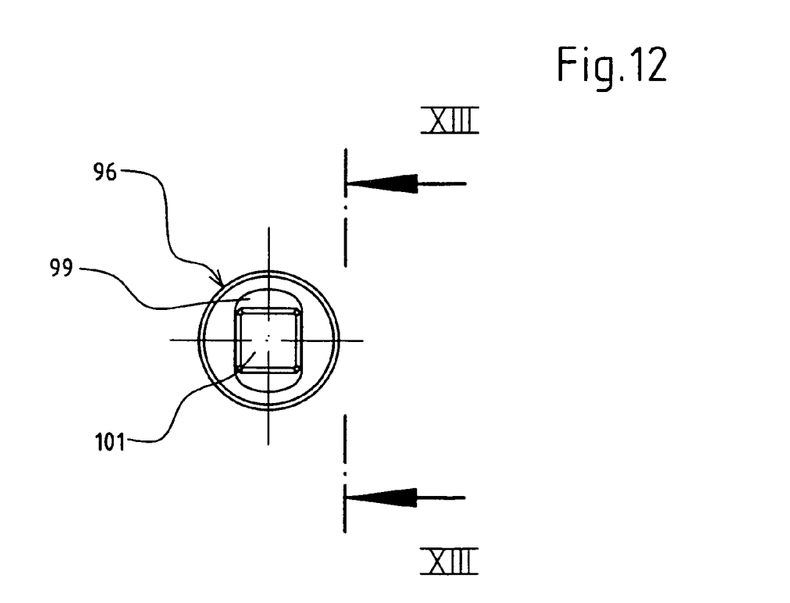
FIG. 12 shows a view at the line XII-XII of FIG. 11
Figure 13:
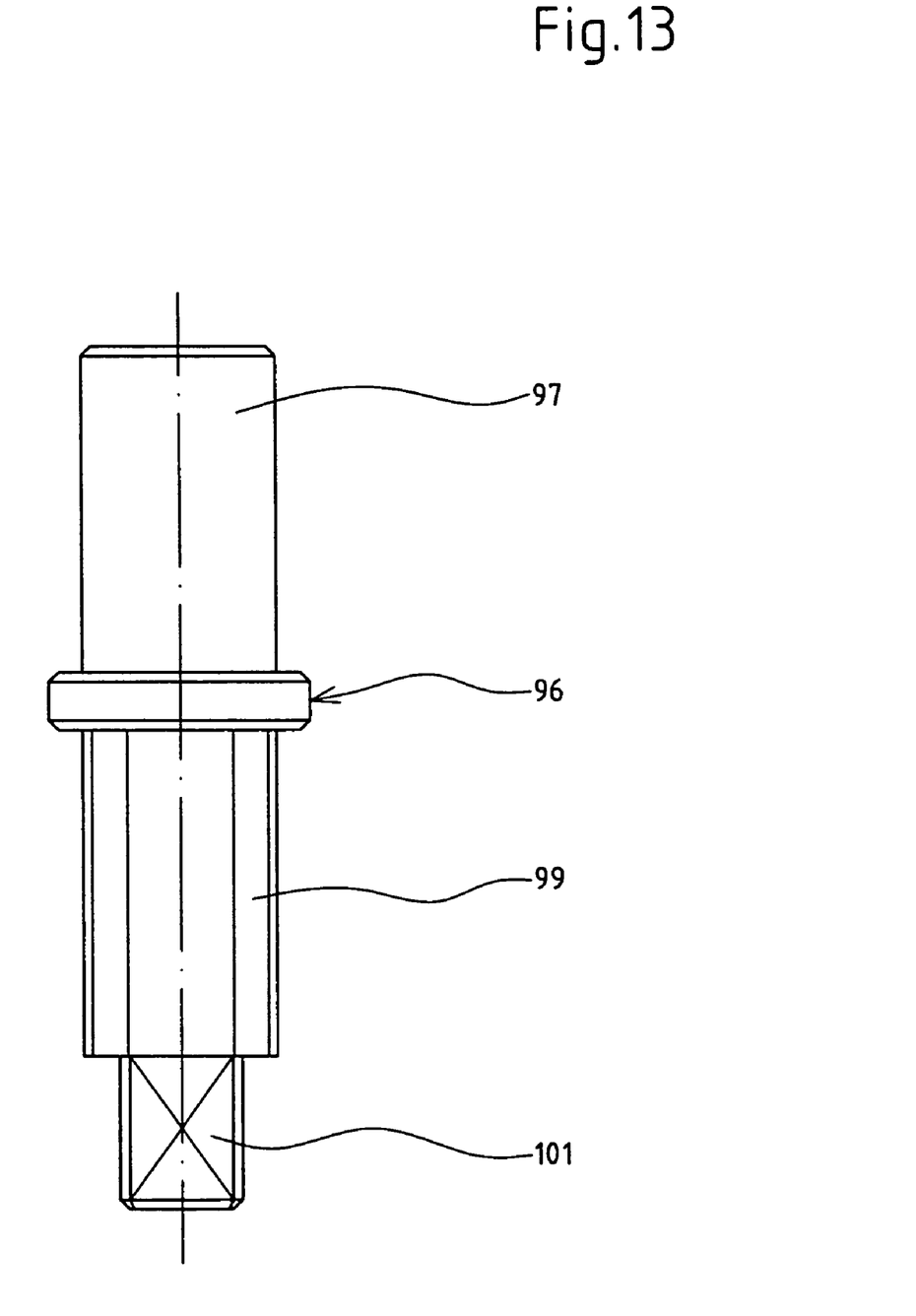
FIG. 13 shows a view at the line XIII-XIII of FIG. 12.

FIGS. 11 to 13 show details of the eccentric bolt 96.

The invention claimed is:

1. An apparatus for distributing gobs of molten glass from a gob feeder in a predetermined sequence through stationary channels onto molds of a plurality of sections of a glass forming machine, said apparatus comprising:

at least one scoop channel having a first end adapted to receive said gobs from said feeder and a second end alignable with one of said stationary channels, said scoop channel being rotatable about an axis for aligning said second end of said scoop channel with said stationary channels;

a pinion attached to said scoop channel proximate to said first end thereof, said pinion being fixed to and rotatable with said scoop channel about said axis;

an electrical motor for rotating said pinion and thereby rotating said scoop channel about said axis;

a gear train transmitting torque from said motor to said pinion, said gear train including a screw engaged with said motor, said motor being adapted to rotate said screw in a reciprocating manner, a worm wheel engaged with said screw and rotatable in response to rotation of said screw, a toothed wheel mounted coaxially with said worm wheel and fixed thereto so as to rotate with said worm wheel, said toothed wheel driving said pinion for effecting rotation of said scoop channel upon rotation of said screw by said motor;

an intermediate toothed wheel engaging both said pinion and said toothed wheel, said intermediate toothed wheel transmitting torque from said toothed wheel to said pinion for effecting rotation of said scoop channel upon rotation of said screw by said motor; and said intermediate toothed wheel comprising first and second partial toothed wheels positioned in overlying relation coaxially aligned with one another, said first and second partial toothed wheels being rotationally adjustable with respect to each other about an axis of rotation in order to minimize clearance between themselves and the pinion and the toothed wheel at the periphery thereof, means being provided for fixing a relative rotational position of said first partial toothed wheel to said second partial toothed wheel.

2. Apparatus according to claim 1, wherein said scoop channel comprises:

a housing;

a sleeve rotatably mounted within said housing, said sleeve defining an axial aperture coaxially aligned with said first end of said scoop channel, said axial aperture adapted to receive and pass said gobs therethrough; and said pinion comprises an externally-toothed ring surrounding said sleeve and attached thereto, said sleeve being attached to and rotating with said first end of said scoop channel.

3. Apparatus according to claim 1, wherein said means for fixing said relative rotational position comprises an eccentric bolt having a first portion with a circular cross section rotatably mounted within an axially extending first bore positioned in said first partial toothed wheel eccentrically to said axis of rotation, said first bore having a shape complementary to said circular cross section, said eccentric bolt further having a second portion having a non-round cross section positioned within an axially extending second bore eccentrically positioned in said second partial toothed wheel, rotation of said bolt relatively to said partial toothed wheels fixing said relative rotational position of said partial toothed wheels to one another about said axis of rotation.

4. Apparatus according to claim 1, wherein said first and second partial toothed wheels are engaged with both said toothed wheel and with at least one of said pinions.

5. Apparatus according to claim 1, further comprising a coupling connecting said electrical motor to said screw.

6. Apparatus according to claim 1, further comprising a means for pivotally mounting said apparatus on said glass forming machine for reciprocally pivoting said apparatus about a vertical axis.

7. Apparatus according to claim 6, further comprising a piston and cylinder for effecting pivoting movement of said apparatus relatively to said glass forming machine, said cylinder being attached in a pivotable manner to said glass forming machine, said apparatus comprising a lever to which said piston is pivotably attached.

8. Apparatus according to claim 7, further comprising a positioning body mounted on said lever in spaced apart relation to a longitudinal axis thereof, said positioning body cooperating with a positioning stop mounted on said glass forming machine for positioning said lever in a normal position in both a horizontal and vertical direction.

9. An apparatus for distributing gobs of molten glass from a gob feeder in a predetermined sequence through stationary channels onto molds of a plurality of sections of a glass forming machine, said apparatus comprising:
at least one scoop channel having a first end adapted to receive said gobs from said feeder and a second end alignable with one of said stationary channels, said scoop channel being rotatable about an axis for aligning said second end of said scoop channel with said stationary channels;
a pinion attached to said scoop channel proximate to said first end thereof, said pinion being fixed to and rotatable with said scoop channel about said axis;
an electrical motor for rotating said pinion and thereby rotating said scoop channel about said axis;
a gear train transmitting torque from said motor to said pinion, said gear train including a screw engaged with said motor, said motor being adapted to rotate said screw in a reciprocating manner, a worm wheel engaged with said screw and rotatable in response to rotation of said screw, a toothed wheel mounted coaxially with said worm wheel and fixed thereto so as to rotate with said worm wheel, said toothed wheel driving said pinion for effecting rotation of said scoop channel upon rotation of said screw by said motor;
first and second intermediate toothed wheels, each engaging said toothed wheel, said first intermediate toothed wheel engaging a first one of said pinions, said second intermediate toothed wheel engaging a second one of said pinions, said first and second pinions being attached, respectively, to first and second ones of said scoop channels, said first and second intermediate toothed wheels transmitting torque from said toothed wheel to said first and second pinions for effecting rotation of said first and second scoop channels upon rotation of said screw by said motor; and
said intermediate toothed wheels comprising first and second partial toothed wheels positioned in overlying relation coaxially aligned with one another, said first and second partial toothed wheels being rotationally adjustable with respect to each other about an axis of rotation in order to minimize clearance between themselves and the pinions and the toothed wheel at the periphery thereof, means being provided for fixing a relative rotational position of said first partial toothed wheel to said second partial toothed wheel for each of said intermediate toothed wheels.

10. Apparatus according to claim 9, wherein each of said intermediate toothed wheels engages two of said pinions.

11. Apparatus according to claim 9, wherein each of said scoop channels comprises:
a housing;
a sleeve rotatably mounted within said housing, said sleeve defining an axial aperture coaxially aligned with said first end of said scoop channel, said axial aperture adapted to receive and pass said gobs therethrough; and
said pinion on each said scoop channel comprises an externally-toothed ring surrounding said sleeve and attached thereto, said sleeve being attached to and rotating with said first end of said scoop channel.

12. Apparatus according to claim 9, wherein said first and second partial toothed wheels are engaged with both said toothed wheel and with at least one of said pinions.

13. Apparatus according to claim 9, further comprising a coupling connecting said electrical motor to said screw.

14. Apparatus according to claim 9, further comprising a means for pivotally mounting said apparatus on said glass forming machine for reciprocally pivoting said apparatus about a vertical axis.

15. An apparatus for distributing gobs of molten glass from a gob feeder in a predetermined sequence through stationary channels onto molds of a plurality of sections of a glass forming machine, said apparatus comprising:
at least one scoop channel having a first end adapted to receive said gobs from said feeder and a second end alignable with one of said stationary channels, said scoop channel being rotatable about an axis for aligning said second end of said scoop channel with said stationary channels;
a pinion attached to said scoop channel proximate to said first end thereof, said pinion being fixed to and rotatable with said scoop channel about said axis;
an electrical motor for rotating said pinion and thereby rotating said scoop channel about said axis;
a gear train transmitting torque from said motor to said pinion, said gear train including a screw engaged with said motor, said motor being adapted to rotate said screw in a reciprocating manner, a worm wheel engaged with said screw and rotatable in response to rotation of said screw, a toothed wheel mounted coaxially with said worm wheel and fixed thereto so as to rotate with said worm wheel, said toothed wheel driving said pinion for effecting rotation of said scoop channel upon rotation of said screw by said motor;
first and second intermediate toothed wheels, each engaging said toothed wheel, said first intermediate toothed wheel engaging a first one of said pinions, said second intermediate toothed wheel engaging a second one of said pinions, said first and second pinions being attached, respectively, to first and second ones of said scoop channels, said first and second intermediate toothed wheels transmitting torque from said toothed wheel to said first and second pinions for effecting rotation of said first and second scoop channels upon rotation of said screw by said motor;

said first and second intermediate toothed wheels each engaging only one of said pinions; and each of said intermediate toothed wheels comprising first and second partial toothed wheels positioned in overlying relation coaxially aligned with one another, said first and second partial toothed wheels being rotationally adjustable about an axis of rotation with respect to each other in order to minimize clearance between themselves and the pinions and the toothed wheel at the periphery thereof, means being provided for fixing a relative rotational position of said first partial toothed wheel to said second partial toothed wheel for each of said intermediate toothed wheels.

16. Apparatus according to claim 15, wherein each of said scoop channels comprises:
a housing;
a sleeve rotatably mounted within said housing, said sleeve defining an axial aperture coaxially aligned with said first end of said scoop channel, said axial aperture adapted to receive and pass said gobs therethrough; and
said pinion on each said scoop channel comprises an externally-toothed ring surrounding said sleeve and attached thereto, said sleeve being attached to and rotating with said first end of said scoop channel.

17. Apparatus according to claim 15, further comprising a coupling connecting said electrical motor to said screw.

18. Apparatus according to claim 15, further comprising a means for pivotally mounting said apparatus on said glass forming machine for reciprocally pivoting said apparatus about a vertical axis.

19. An apparatus for distributing gobs of molten glass from a gob feeder in a predetermined sequence through stationary channels onto molds of a plurality of sections of a glass forming machine, said apparatus comprising:
at least one scoop channel having a first end adapted to receive said gobs from said feeder and a second end alignable with one of said stationary channels, said scoop channel being rotatable about an axis for aligning said second end of said scoop channel with said stationary channels;
a pinion attached to said scoop channel proximate to said first end thereof, said pinion being fixed to and rotatable with said scoop channel about said axis;
an electrical motor for rotating said pinion and thereby rotating said scoop channel about said axis;
a gear train transmitting torque from said motor to said pinion, said gear train including screw engaged with said motor, said motor being adapted to rotate said screw in a reciprocating manner, a worm wheel engaged with said screw and rotatable in response to rotation of said screw, a toothed wheel mounted coaxially with said worm wheel and fixed thereto so as to rotate with said worm wheel, said toothed wheel driving said pinion for effecting rotation of said scoop channel upon rotation of said screw by said motor;
first and second intermediate toothed wheels, each engaging said toothed wheel, said first intermediate toothed wheel engaging a first one of said pinions, said second intermediate toothed wheel engaging a second one of said pinions, said first and second pinions being attached, respectively, to first and second ones of said scoop channels, said first and second intermediate toothed wheels transmitting torque from said toothed wheel to said first and second pinions for effecting rotation of said first and second scoop channels upon rotation of said screw by said motor;

said second intermediate toothed wheel engaging a third one of said pinions, said third pinion being attached to a third one of said scoop channels, said second intermediate toothed wheel transmitting torque from said toothed wheel to said third pinion for effecting rotation of said third scoop channel upon rotation of said screw by said motor; and each of said intermediate toothed wheels comprising first and second partial toothed wheels positioned in overlying relation coaxially aligned with one another, said first and second partial toothed wheels being rotationally adjustable about an axis of rotation with respect to each other in order to minimize clearance between themselves and the pinions and the toothed wheel at the periphery thereof, means being provided for fixing a relative rotational position of said first partial toothed wheel to said second partial toothed wheel for each of said intermediate toothed wheels.

20. Apparatus according to claim 19, wherein each of said scoop channels comprises:
a housing;
a sleeve rotatably mounted within said housing, said sleeve defining an axial aperture coaxially aligned with said first end of said scoop channel, said axial aperture adapted to receive and pass said gobs therethrough; and
said pinion on each said scoop channel comprises an externally-toothed ring surrounding said sleeve and attached thereto, said sleeve being attached to and rotating with said first end of said scoop channel.

21. An apparatus for distributing gobs of molten glass from a gob feeder in a predetermined sequence through stationary channels onto molds of a plurality of sections of a glass forming machine, said apparatus comprising:
at least one scoop channel having a first end adapted to receive said gobs from said feeder and a second end alignable with one of said stationary channels, said scoop channel being rotatable about an axis for aligning said second end of said scoop channel with said stationary channels, said scoop channel comprising a housing and a sleeve rotatably mounted within said housing, said sleeve defining an axial aperture coaxially aligned with said first end of said scoop channel, said axial aperture adapted to receive and pass said gobs therethrough;
a pinion attached to said scoop channel proximate to said first end thereof, said pinion being fixed to and rotatable with said scoop channel about said axis, said pinion comprising an externally-toothed ring surrounding said sleeve and attached thereto, said sleeve being attached to and rotating with said first end of said scoop channel;
an electrical motor for rotating said pinion and thereby rotating said scoop channel about said axis;
a gear train transmitting torque from said motor to said pinion, said gear train including a screw engaged with said motor, said motor being adapted to rotate said screw in a reciprocating manner, a worm wheel engaged with said screw and rotatable in response to rotation of said screw, a toothed wheel mounted coaxially with said worm wheel and fixed thereto so as to rotate with said worm wheel, said toothed wheel driving said pinion for effecting rotation of said scoop channel upon rotation of said screw by said motor;

an intermediate toothed wheel engaging both said pinion and said toothed wheel, said intermediate toothed wheel transmitting torque from said toothed wheel to said pinion for effecting rotation of said scoop channel upon rotation of said screw by said motor; and said intermediate toothed wheel comprising first and second partial toothed wheels positioned in overlying relation coaxially aligned with one another, said first and second partial toothed wheels being rotationally adjustable about an axis of rotation with respect to each other in order to minimize clearance between themselves and the pinion and the toothed wheel at the periphery thereof, means being provided for fixing a relative rotational position of said first partial toothed wheel to said second partial toothed wheel.

22. Apparatus according to claim 21, further comprising:
an outer sleeve mounted on said housing; and
a connection sleeve rotatably mounted coaxially within said outer sleeve, said connection sleeve extending between and coaxially aligned with said sleeve and said first end of said scoop channel, said scoop channel comprising a side wall having first and second cooling ducts extending therethrough, said connection sleeve having first and second annular ducts sealed with respect to one another, said first annular duct being in fluid communication with said first cooling duct and a cooling medium supply line in said outer sleeve, said second annular duct being in fluid communication with said second cooling duct and a cooling medium return line in said outer sleeve.

23. Apparatus according to claim 21, further comprising:
an outer sleeve mounted on said housing; and
a connection sleeve rotatably mounted coaxially within said outer sleeve, said connection sleeve extending between and coaxially aligned with said sleeve and said first end of said scoop channel, said scoop channel comprising a side wall having a cooling duct extending therethrough and open to the atmosphere, said connection sleeve having an annular duct in fluid communication with said cooling duct and a cooling gas supply line in said outer sleeve.

* * * * *